(12) United States Patent
Larsson et al.

(10) Patent No.: US 6,282,427 B1
(45) Date of Patent: Aug. 28, 2001

(54) SELECTION OF LOCATION MEASUREMENT UNITS FOR DETERMINING THE POSITION OF A MOBILE COMMUNICATION STATION

(75) Inventors: Erik Larsson, Kista; Ari Kangas, Uppsala, both of (SE); Sven Fischer, Nürnberg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/353,239

(22) Filed: Jul. 14, 1999

(51) Int. Cl.[7] .................................................. H04Q 7/20
(52) U.S. Cl. ........................ 455/456; 455/67.1; 342/450; 342/457
(58) Field of Search .................................. 455/422, 456, 455/67.1, 525, 423; 342/357, 450, 457

(56) References Cited

U.S. PATENT DOCUMENTS

| | | | |
|---|---|---|---|
| 5,058,200 | * 10/1991 | Huang et al. | 455/456 |
| 5,293,645 | * 3/1994 | Sood | 455/456 |
| 6,006,097 | * 12/1999 | Hornfeldt et al. | 455/456 |
| 6,212,392 | * 4/2001 | Fitch et al. | 455/456 |

FOREIGN PATENT DOCUMENTS

| | | | |
|---|---|---|---|
| 0528627 | 2/1993 | (EP) | G01S/5/10 |
| 9921389 | 4/1999 | (WO) | H04Q/7/38 |
| 9931921 | 6/1999 | (WO) | H04Q/7/38 |

OTHER PUBLICATIONS

IEEE Transactions on Vehicular Technology, May 1998, "Subscriber Location in CDMA Cellular Networks", J. Caffery, Jr. et al., USA, May 1998, vol. 47, NR. 2, pp. 406–416, XP002125127, ISSN: 0018–9545.

IEE Colloquium Novel Methods of Location and Tracking of Cellular Mobiles and Their System Application (Ref. No. 1999/046), "Comparison of Methods of Locating and Tracking Cellular Mobiles", I. Jami et al., London, UK, pp. 1/1–1/6, XP002125128.

* cited by examiner

Primary Examiner—Nay Maung
Assistant Examiner—Quochien B. Vuong
(74) Attorney, Agent, or Firm—Jenkens & Gilchrist, P.C.

(57) ABSTRACT

In selecting location measurement units for measuring an uplink signal received from a mobile communication station operating in a wireless communication network in order to locate the position of the mobile communication station in the wireless communication network, a possible position of the mobile station in the network is identified. The location measurement units to be used in measuring the uplink signal can then be identified by evaluating one or more of relative positional relationships between the possible position of the mobile station and a plurality of further positions respectively associated with a plurality of location measurement units in the network; path loss measures predicted for each of a plurality of location measurement units relative to the possible position of the mobile station; and geometric dilution of precision (GDOP) values determined for each of a plurality of groups of location measurement units with respect to the possible position of the mobile station.

27 Claims, 8 Drawing Sheets

SELECTION OF LOCATION MEASUREMENT UNITS FOR DETERMINING THE POSITION OF A MOBILE COMMUNICATION STATION

FIELD OF THE INVENTION

The invention relates generally to locating the position of a mobile communication unit in a wireless communication network and, more particularly, to the selection of location measurement units to make uplink signal measurements.

BACKGROUND OF THE INVENTION

The ability to locate the position of a mobile communication unit operating in a wireless communication system provides many well known advantages. Exemplary uses of such position locating capability include security applications, emergency response applications, and travel guidance applications. Among several possible techniques for providing position locating capability, techniques that make measurements on uplink signals from the mobile unit are attractive, because they normally do not require any changes to the mobile units.

One example of an uplink time of arrival approach will now be described with respect to the Global System for Mobile Communication (GSM), which is exemplary of a wireless communication system in which uplink time of arrival techniques are applicable. When an external application (or the GSM network itself) decides to locate the position of a mobile unit (also referred to as mobile station MS), a Mobile Location Center forces (via a base station controller) the mobile unit to perform a conventional asynchronous handover, whereupon the mobile unit transmits up to 70 uplink access bursts, one burst per TDMA frame (i.e., one burst every 8 time slots). The mobile unit transmits the access bursts in an attempt to comply with the asynchronous handover command.

The Mobile Location Center (MLC) orders a number of Location Measurement Units (LMUs) to capture the access bursts and measure the time of arrival of each burst at each LMU. The LMUs then provide the MLC with their time of arrival measurements and reliability estimates for these measurements. In order to compute the position of the mobile station, the MLC uses the time of arrival values and corresponding reliability parameters, the geographic location coordinates of the LMUs, and information regarding time differences among the respective internal time bases of the LMUs. For example, each LMU can be provided with an absolute time reference (e.g., a Global Positioning System (GPS) clock), in which case the LMUs are all synchronized together, so that relative time differences among the LMUs are not a factor in the MLC's calculation of the position of the mobile station.

However, if the LMUs do not include an absolute time reference, then the relative differences among their respective local time references can be determined, for example, by having each LMU measure the time of arrival of an uplink burst from a stationary reference mobile station positioned at a known location in the network. The time of arrival information for the reference mobile station is then transmitted from the LMUs to the MLC. The MLC can use these time of arrival measurements to compute the relative differences in the timing references of the respective LMUs, also referred to as inter-LMU time differences (ILTDs).

Other conventional techniques are also available for determining the ILTDs.

Because the MLC knows the ILTDs (or alternatively knows that the LMUs are all synchronized by a GPS system), it can calculate an estimate of the position of a given mobile station from the time of arrival information provided by the LMUs, using conventional Time Difference of Arrival (TDOA) techniques.

The LMUs which should participate in a positioning measurement must be configured before they can make TOA measurements. That is, the LMUs need information about measurement starting time, measurement frequency, hopping sequence and other parameters. The MLC conventionally provides the LMUs with all the information they need to make the TOA measurements. Therefore, the MLC must select the LMUs for a certain positioning measurement prior to the measurement. To position a certain mobile station, TOA measurements must be performed by at least 3 LMUs. However, to avoid situations with poor measurement geometry and to combat low SNR (signal-to-noise ratio), it may be preferable to use more (e.g., 5–7) LMUs for the TOA measurements. On the other hand, due to capacity constraints, the MLC should preferably select as few as possible LMUs for the TOA measurements. The accuracy of a position fix depends on the accuracy of the individual TOA measurements and on the measurement geometry.

Therefore, it is important to select the LMUs such that (1) a good measurement geometry is obtained and (2) the link from the MS to the selected LMU has a good quality, e.g., a good SNR. The invention enables a mobile location node such as an MLC to select LMUs according to how well the LMUs fulfill these requirements.

DETAILED DESCRIPTION

Figure 1:
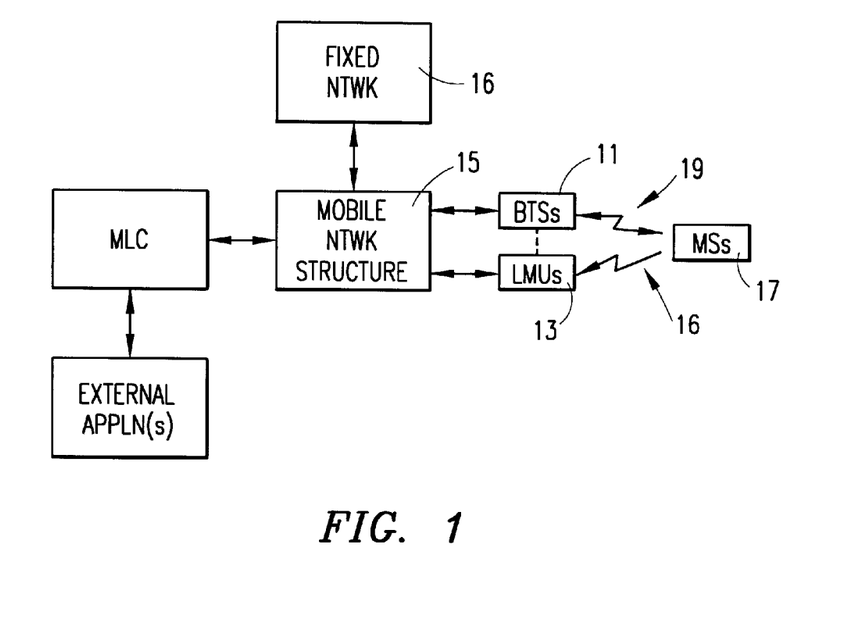
FIG. 1 illustrates an exemplary communication system according to the invention.

FIG. 1 illustrates pertinent portions of an exemplary communication system in which the present invention is applicable. A mobile location node, for example a Mobile Location Center MLC in a GSM system, is coupled to a plurality of fixed-site radio transceivers 11 and a plurality of Location Measurement Units LMUs 13 by a mobile network structure 15. In cellular communication systems, the fixed-site transceivers 11 define one or more cells. One or more of the LMUs can be cosited with one or more of the fixed-site transceivers 11 as indicated diagrammatically by the broken line connection therebetween. The mobile network structure can include one or more fixed-site transceiver controllers, such as base station controllers BSCs in GSM systems, and one or more mobile switching exchanges, such as the mobile switching centers MSCs in GSM systems. The above-described coupling between the mobile location center MLC and the fixed-site transceivers 11 and LMUs 13 via the mobile network structure 15 is well known in the art.

The fixed-site transceivers 11 (e.g., GSM base stations BTS) communicate with a plurality of mobile stations 17 via a conventional radio interface illustrated generally at 19. Such communications are well known in the art. Also, the LMUs 13 receive at 16 uplink radio communications from the mobile stations. The LMUs perform conventional measurements relative to these uplink signals, such as time of arrival or angle of arrival measurements, and these measurements are used in conventional fashion to locate the positions of the mobile stations. Such operations are well known in the art.

Also in the example of FIG. 1, the mobile network structure 15 is coupled to a fixed network 16 (e.g., a PSTN), thereby permitting mobile stations to communicate with terminals in the fixed network via the fixed-site transceivers 11, the mobile network structure 15 and the fixed network 16.

As mentioned above, selection of LMUs is done before the uplink signal measurement is performed. Therefore, the MLC needs a rough estimate of a given mobile station's position in order to select the LMUs that will make the measurements used to locate that mobile station's position. To obtain a first (rough) position estimate, the MLC is provided with the serving cell identity and the Timing Advance (TA) value, both of which are conventionally available to the MLC from the network structure.

Given the cell identity and the TA value of the serving cell, the MLC knows that the mobile is between two circle sectors in a sectorized system, or between two circles in an omnicell system. More specifically, and referencing FIG. 4, the mobile station is within area 41 in a sectorized system, or within an area corresponding to area 41 but extending through 360° in an omnicell system. The radial dimension of area 41 is typically on the order of 500 meters. Mathematically, this can be expressed as follows.

Figure 2:
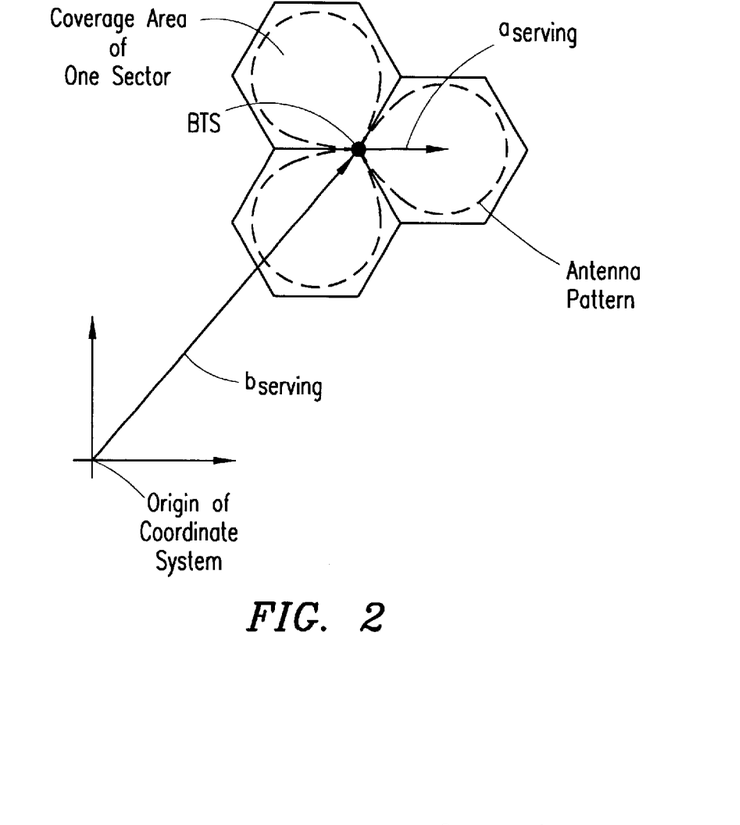
FIGS. 2–5 illustrate exemplary geometric relationships utilized by the present invention.
Figure 3:
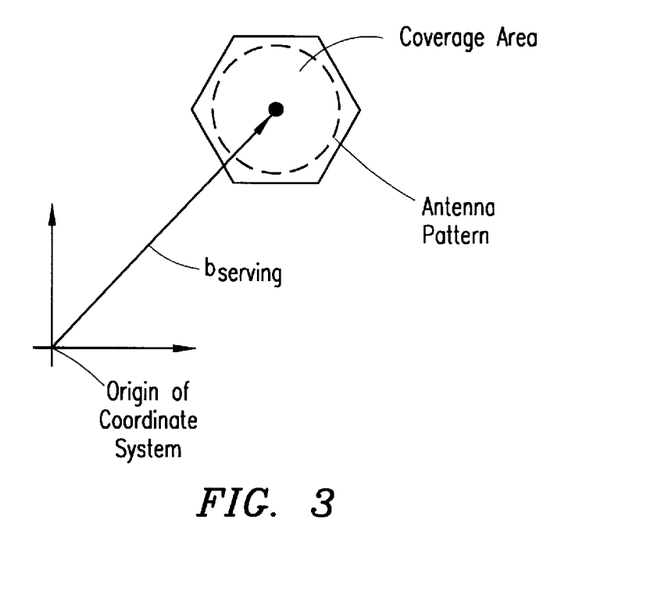
Figure 4:
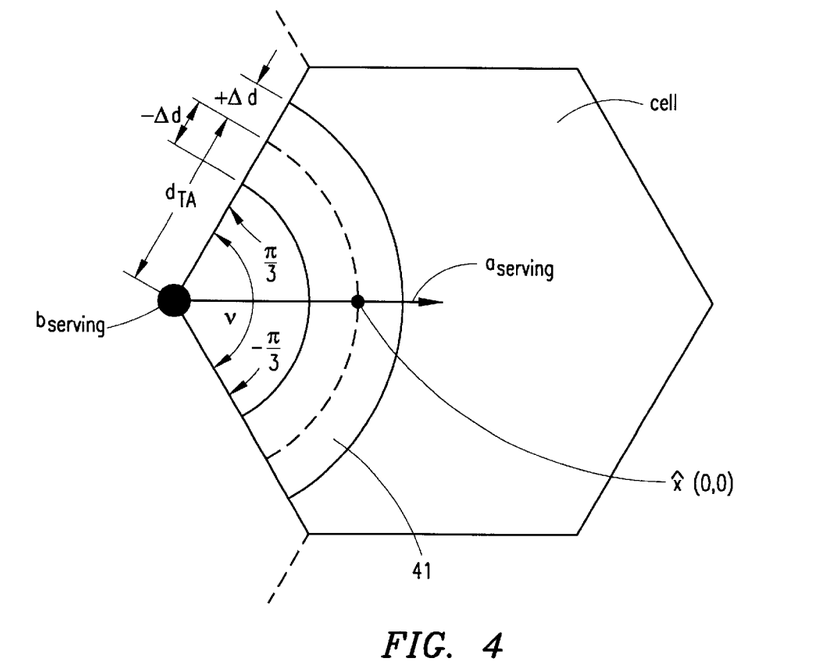

Consider the circle sector given by the radii $d_{TA} \pm \Delta_d$ (see area 41 of FIG. 4), were $d_{TA}$ is the TA value expressed in range units (e.g., meters) and $\Delta_d$ is the uncertainty of the TA value due to quantization, noise/interference, multipath, measurement error, etc. Parameterizing the angle v (see FIG. 4) and the radius uncertainty $\Delta_d$ yields the possible location area $\hat{x}(v, \Delta_d)$ of the MS:

$$\hat{x}(v, \Delta_d) = b_{serving} + (d_{TA} + \Delta_d)\begin{bmatrix} \cos v & -\sin v \\ \sin v & \cos v \end{bmatrix}\frac{a_{serving}}{|a_{serving}|} \qquad \text{Equation 1}$$

where $-\pi/3 < v < \pi/3$ (sectorized system), or $0 < v < 2\pi$ (omnicell system), $-400 \text{ m} < \Delta_d < 200 \text{ m}$, $b_{serving}$ is the vector of the coordinates of the serving base station, $a_{serving}$ is the antenna normal vector of the serving base station, and where $|a_{serving}|$ is included to normalize vector $a_{serving}$. FIGS. 2 and 3 illustrate examples of the aforementioned vectors relative to the origin of a geographical coordinate system such as a Cartesian coordinate system. FIG. 2 illustrates $b_{serving}$ and $a_{serving}$ in a sectorized system, and FIG. 3 illustrates $b_{serving}$ in an omnicell system (wherein $a_{serving}$ is 0).

Equation 1 describes the possible location of the MS given the cell identity and the TA value. Equation 1 can be calculated by the MLC, and is the starting point for selecting the LMUs.

Figure 5:
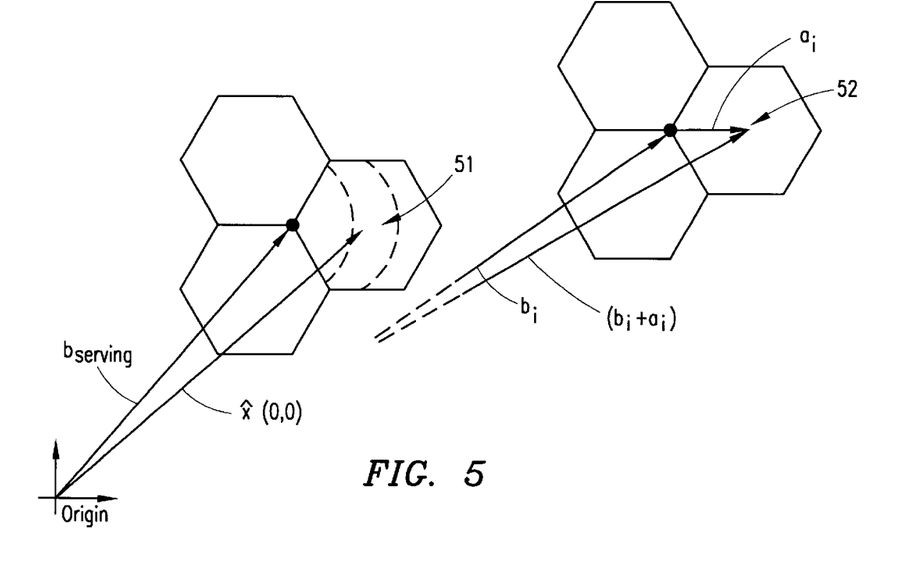

The MLC can calculate the possible MS location area using Equation 1, and can determine the middle (or center), $\hat{x}(0,0)$, of this MS location area. In the case of an omnicell system, $\hat{x}(0,0)=b_{serving}$, and in the case of a sectorized system, $\hat{x}(0,0)$ defines the middle of the circle sector as shown in FIG. 4. The MLC can, for example, include a data base in which are stored network data such as the coordinate vectors and antenna normal vectors of all base stations and LMUs in the network. The MLC searches in its data base for those LMUs which are closest to the middle of the location area, $\hat{x}(0,0)$. This can be done using Equation 2 below.

$$d_i = |\hat{x}(0,0) - (b_i + a_i)| \qquad \text{Equation 2}$$

where $b_i$ and $a_i$ are the coordinate and antenna normal vectors, respectively, of the selected LMU i. Examples of the vectors $b_i$ and $a_i$ are illustrated generally in FIG. 5. Equation 2 represents the distance between points 51 and 52 in FIG. 5, point 51 corresponding to the middle of the possible location area, $\hat{x}(0,0)$, and point 52 being defined by vector $(b_i+a_i)$ for the ith LMU. With this method, primarily nearby LMUs with antennas pointing towards the mobile station will be selected.

Figure 6:
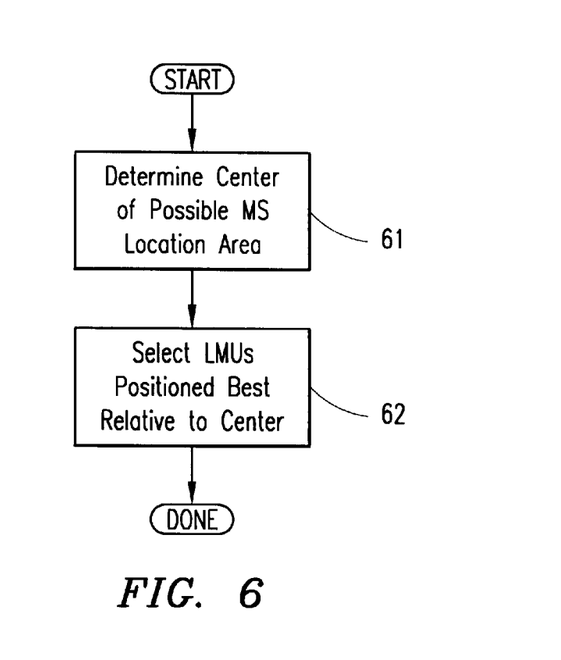
FIG. 6 illustrates exemplary operations which can be performed by embodiments of the mobile location node of FIG. 1.

FIG. 6 illustrates one example of the operations described above with respect to Equations 1 and 2. At 61, the center (middle) point of the possible mobile station location area is determined, for example using $\hat{x}(0,0)$ in Equation 1. At 62, a desired number of LMUs positioned most favorably relative to the calculated center point are selected to perform the desired mobile station positioning operation. For example, those LMUs whose corresponding vectors $(b_i+a_i)$ produce the smallest values of $d_i$ in Equation 2 can be selected.

Figure 7:
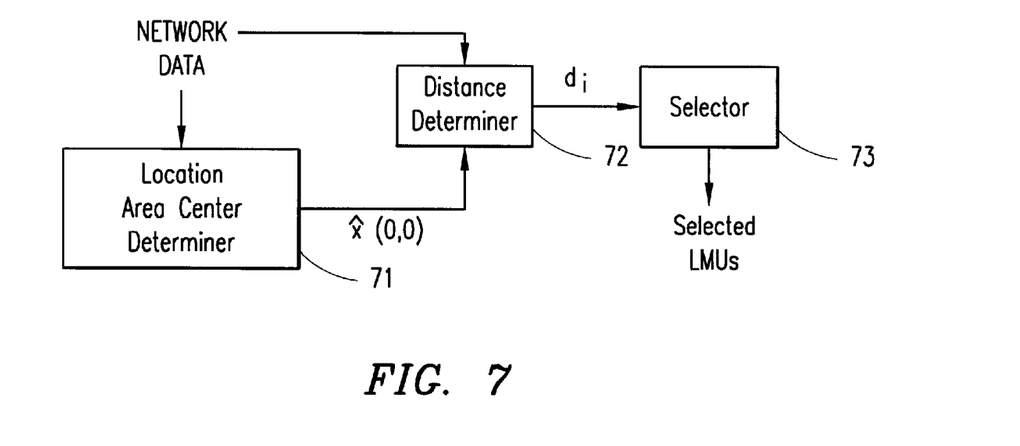
FIG. 7 illustrates an exemplary portion of the mobile location node of FIG. 1 for performing the exemplary operations of FIG. 6.

FIG. 7 illustrates pertinent portions of an exemplary embodiment of the mobile location node of FIG. 1, which can perform the operations illustrated in FIG. 6. A location area center determiner 71 uses available network data $(b_{serving}, a_{serving}, d_{TA})$ to determine the center, $\hat{x}(0,0)$ of the possible location area using Equation 1. A distance determiner 72 is coupled to the location area center determiner 71, and receives therefrom information indicative of the location area center $\hat{x}(0,0)$. The distance determiner 72 also receives network data, $b_i$ and $a_i$, for each candidate LMU. The distance determiner 72 uses the received network data and the location area center information in Equation 2 to calculate $d_i$ for each LMU$_i$. A selector 73 receives information indicative of the calculated distances $d_i$ and selects a desired number of LMUs corresponding to the smallest distances $d_i$.

Figure 8:
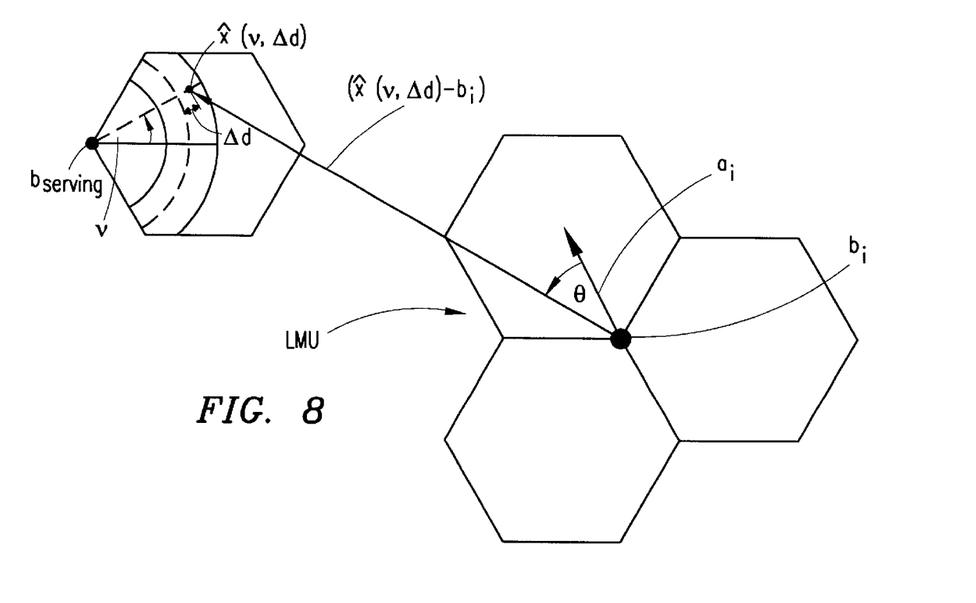
FIG. 8 illustrates further exemplary geometric relationships utilized by the invention.

In general, the cosine of the angle between two vectors is given by the scalar product of the two vectors divided by the product of the magnitudes of the two vectors. Referring now to the example LMU illustrated in FIG. 8, the angle θ between (1) the antenna normal vector $a_i$ of the LMU and (2) the vector difference $\hat{x}(v,\Delta_d) - b_i$ between the LMU coordinate vector $b_i$ and a given mobile station position vector $\hat{x}(v,\Delta_d)$, can be readily calculated as follows:

$$\Theta = a\cos\left(\hat{x}(v,\Delta_d)-b_i\right)\cdot a_i/|\hat{x}(v,\Delta_d)-b_i||a_i|\qquad \text{Equation 3}$$

The angle θ can then be used in conjunction with an associated antenna gain function $g_i$ to calculate the antenna gain of the antenna used by the LMU of FIG. 8.

Antenna gain functions $g_i$ can be stored, for example, in the aforementioned data base in the MLC, indexed against the corresponding types of antennas having those gain functions. Each LMU can, upon installation thereof in the network, communicate its antenna type (or the antenna type of its cosited base station if it shares the base station antenna) to the MLC. The MLC can then access its data base and use the communicated antenna type to match the LMU to the corresponding antenna gain function. The antenna gain of the LMU for the angle θ can then be determined by plugging θ into the corresponding antenna gain function to produce $g_i(\theta)$.

This antenna gain can then be multiplied by a conventional path loss model function of the distance between the mobile station and the LMU of FIG. 8, for example the Okumura-Hata function, $$f(d) = \left(\frac{d}{d_0}\right)^{\gamma}.$$

In exemplary formulations of this path loss model function, $d_0=1$, and $\gamma=1, 2, 3, 4$, or 5. Of course, the distance d in this formula is simply the magnitude of the vector $(\hat{x}(v,\Delta_d)-b_i)$ shown in FIG. 8. The path loss model function can also be stated in decibels as $$f(d)[\text{dB}] = 10\cdot\gamma\cdot\log_{10}\left(\frac{d}{d0}\right).$$

The Okumura-Hata function is described in M. Hata, "Empirical Formula for Propagation Loss in Land Mobile Radio Services", IEEE Transactions on Vehicular Technology, vol. 29, no. 3, August 1980, pp. 217–325, incorporated herein by reference.

Multiplying the aforementioned antenna gain function by the aforementioned path loss function provides a mean path loss measure $L_i$ for the LMU of FIG. 8 as follows:

$$L_i(v,\Delta_d)=g_i(\theta)\cdot f(d).\qquad \text{Equation 4}$$

Equation 4 can also be expressed in decibels as follows:

$$L_i(v,\Delta_d)[\text{dB}]=g_i(\theta)[\text{dB}]+f(d)[\text{dB}]\qquad \text{Equation 4A}$$

Thus, for a given $LMU_i$, a plurality of mean path loss measures $L_i$ can be predicted for a corresponding plurality of possible locations, $\hat{x}(v,\Delta_d)$, of the mobile station. Exemplary values which can be used to calculate $L_i$ for each LMU include, $v=-\pi/3, 0, \pi/3$ for a sectorized system, $v=0, \pi/3, 2\pi/3, \pi, 4\pi/3$ and $5\pi/3$ for an omnicell system, and $\Delta_d=-400$ m, 200 m. Thus, in this example, for each LMU, six values of $L_i$ would be calculated in a sectorized system, and twelve values of $L_i$ would be calculated in an omnicell system.

Figure 9:
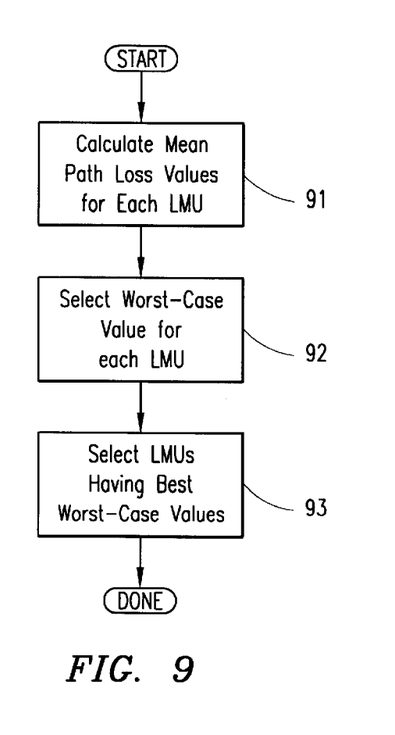
FIG. 9 illustrates further exemplary operations which can be performed by embodiments of the mobile location node of FIG. 1.

FIG. 9 illustrates an example implementation of the above-described procedure. At 91, the mean path loss values $L_i$ are calculated for each candidate LMU according to Equations 1, 3 and 4. As one example, the candidate LMUs can be selected using the exemplary procedure of FIG. 6. At 92, the worst-case (i.e., highest) mean path loss value $L_i$ for each LMU is selected. At 93, a desired number of LMUs having the best (i.e., lowest) worst-case values are selected to perform the desired positioning operation.

Figure 10:
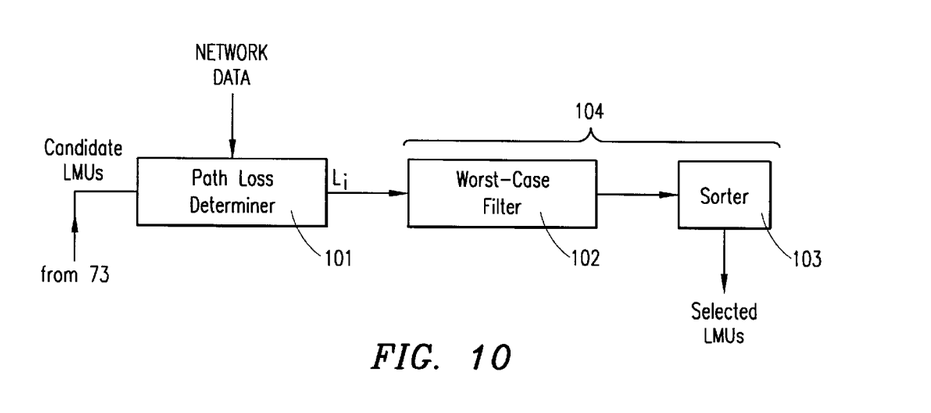
FIG. 10 illustrates an exemplary portion of the mobile location node of FIG. 1 for performing the exemplary operations of FIG. 9.

FIG. 10 illustrates pertinent portions of an exemplary embodiment of the mobile location node of FIG. 1, which can perform the exemplary operations of FIG. 9. A path loss determiner 101 receives information indicative of candidate LMUs, for example, from selector 73 of FIG. 7, and also receives network data defining: $d_{TA}$; the coordinate vectors and antenna normal vectors of the serving base station and the candidate LMUs (i.e., $b_{serving}$, $a_{serving}$, $b_i$ and $a_i$); and the antenna gain functions $g_i$ for the candidate LMUs. The path loss determiner 101 calculates mean path loss values for each LMU according to Equations 1, 3 and 4. A selector 104, including a worst-case filter 102 and a sorter 103, is coupled to path loss determiner 101. The worst-case filter 102 receives the $L_i$ values calculated for each LMU and determines the worst-case value for each LMU. These worst-case values are then forwarded to the sorter 103 which sorts the worst-case values from best to worst, and selects a desired number of LMUs having the best of the worst-case values. It is well known that the accuracy of a positioning system based on range measurements such as TOA (Time of Arrival) or TDOA (Time Difference of Arrival) is heavily dependent on the relative geometry of the receiver (LMU) stations. Positioning accuracy can be estimated as the ranging accuracy multiplied by a dilution factor, GDOP= Geometric Dilution of Precision. The GDOP is conventionally defined as:

$$GDOP=\sqrt{\text{trace }(Q)}\qquad \text{(Equation 5)}$$

where Q is the covariance matrix of the position estimate $\hat{x}$:

$$Q=E\{(\hat{x}-E\{\hat{x}\})(\hat{x}-E\{\hat{x}\})^T\}\qquad \text{(Equation 6)}$$

and $E\{\}$ denotes the statistical expectation. Using a weighted least squares approach to estimate the mobile position $\hat{x}$, the covariance matrix Q is conventionally given by:

$$Q=(G^TR^{-1}G)^{-1}\qquad \text{Equation 7}$$

where $^T$ denotes transpose. Without loss of generality, it can be assumed that the mobile station lies on a two dimensional x-y plane.

The position of the MS is defined as:

$$\hat{x}(v,\Delta_d)=(\hat{x},\hat{y}).\qquad \text{Equation 8}$$

The LMU coordinates can be expressed as $b_i=(x_i, y_i)$ for $i=1, \ldots N$.

The squared distance between the (assumed) mobile station position $\hat{x}$ and the LMUs is $r_i^2=(x_i-\hat{x})^2+(y_i-\hat{y})^2$ for $i=1, \ldots N$.

In the exemplary case of a TDOA (Time Difference of Arrival) positioning system, matrix G is conventionally given by $$G = \begin{bmatrix} (x_1-\hat{x})/r_1-(x_2-\hat{x})/r_2 & (y_1-\hat{y})/r_1-(y_2-\hat{y})/r_2 \\ (x_1-\hat{x})/r_1-(x_3-\hat{x})/r_3 & (y_1-\hat{y})/r_1-(y_3-\hat{y})/r_3 \\ \cdots & \cdots \\ (x_1-\hat{x})/r_1-(x_N-\hat{x})/r_N & (y_1-\hat{y})/r_1-(y_N-\hat{y})/r_N \end{bmatrix} \qquad \text{Equation 9}$$

and the R matrix is given by $$R=HR_0H^T\qquad \text{Equation 10}$$

where H is an (N−1)×N matrix $$H = \begin{bmatrix} -1 & 1 & 0 & 0 & \cdots & 0 \\ -1 & 0 & 1 & 0 & \cdots & 0 \\ \cdots & \cdots & \cdots & \cdots & \cdots & 0 \\ -1 & 0 & 0 & 0 & \cdots & 1 \end{bmatrix}$$

Equation 11 and matrix $R_0$ is given by $$R_0 = \begin{bmatrix} \sigma_1^2 & 0 & 0 & 0 \\ 0 & \sigma_2^2 & 0 & 0 \\ 0 & 0 & \cdots & 0 \\ 0 & 0 & 0 & \sigma_N^2 \end{bmatrix}$$

Equation 12 where each $\sigma_i, i=1, \ldots, N$ is the uncertainty (quality) of the TOA measurement provided by a respective one of N LMUs.

In case of a TOA (Time of Arrival) or AOA (Angle of Arrival) positioning system, G and R are described in: W. H. Foy, "Position-Location Solutions by Taylor-Series Estimation", IEEE Transactions on Aerospace and Electronic Systems, Vol. AES-12, no. 2, March 1976, pp. 187–194, incorporated herein by reference; and D. J. Torrieri, "Statistical Theory of Passive Location Systems", IEEE Transactions on Aerospace and Electronic Systems, Vol. AES-20, no. 2, March 1984, pp. 183–198, incorporated herein by reference.

All of the information needed to determine the covariance matrix Q, and thus the GDOP value, is available except for the $\sigma_i$ values needed to complete the matrix $R_0$. As mentioned above, these values are the uncertainties of the TOA measurements performed by the respective LMUs. These uncertainties of course are not known before the LMUs actually perform their measurements. Accordingly, one embodiment of the present invention uses Equation 4 above to estimate these uncertainty values, that is, the invention assumes $\sigma_i = L_i(\nu, \Delta_d)$. In other words, if the mean path loss $L_i$ is high, it can be assumed that there will be a high TOA estimation uncertainty, whereas if the mean path loss $L_i$ is low, it can be assumed that there is a low TOA estimation uncertainty.

Accordingly, for a given group of LMUs, a plurality of GDOP values can be calculated (according to Equations 1, 3–5 and 7–12), each GDOP value corresponding, for example, to one of the possible mobile station locations described above (6 for sectorized systems, 12 for omnicell systems). For that group of LMUs, the worst-case (i.e., highest) value of all calculated GDOP values can be determined, and then the GDOP calculation process can be repeated as described above but for different groups of LMUs. After the worst-case GDOP value has been determined for each group of LMUs, the group of LMUs having the best (i.e., lowest) worst-case GDOP value can be selected to execute the desired mobile station positioning operation.

Figure 11:
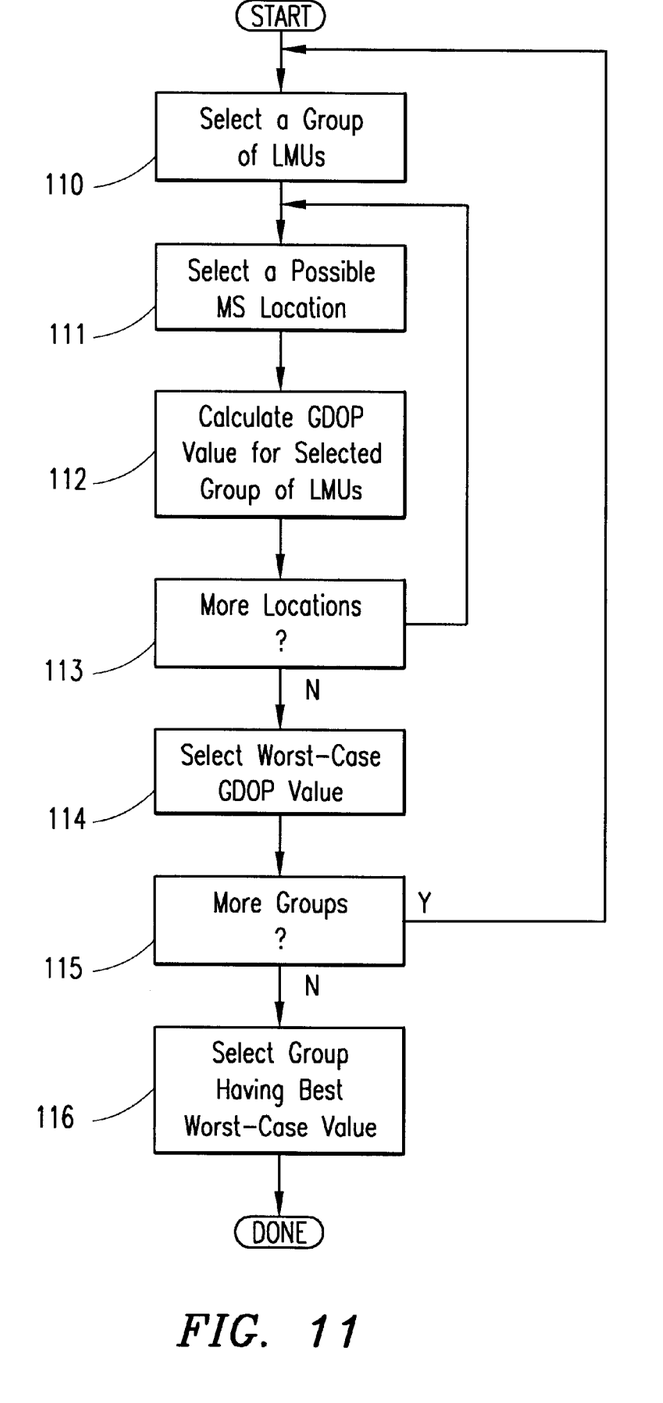
FIG. 11 illustrates further exemplary operations which can be performed by embodiments of the mobile location node of FIG. 1.

FIG. 11 illustrates an example of the above-described use of GDOP values to select LMUs. At 110, a group of LMUs is selected. For example, a group of LMUs can be selected from a set of candidate LMUs produced using the exemplary operations of either of FIGS. 6 or 9. Thereafter at 111, a possible mobile station location is selected. At 112, a GDOP value for the group of LMUs is calculated for that particular possible mobile station location. The operations at 111 and 112 are repeated until it is determined at 113 that all desired mobile station location possibilities have been considered.

Thereafter, at 114, the worst-case GDOP value of all of the GDOP values calculated for the selected group of LMUs is selected. Thereafter, the operations at 110–114 are repeated until it is determined at 115 that all desired groups of LMUs have been considered. Thereafter at 116, the group of LMUs having the best worst-case GDOP value is selected to perform the desired mobile station positioning operation.

Figure 12:
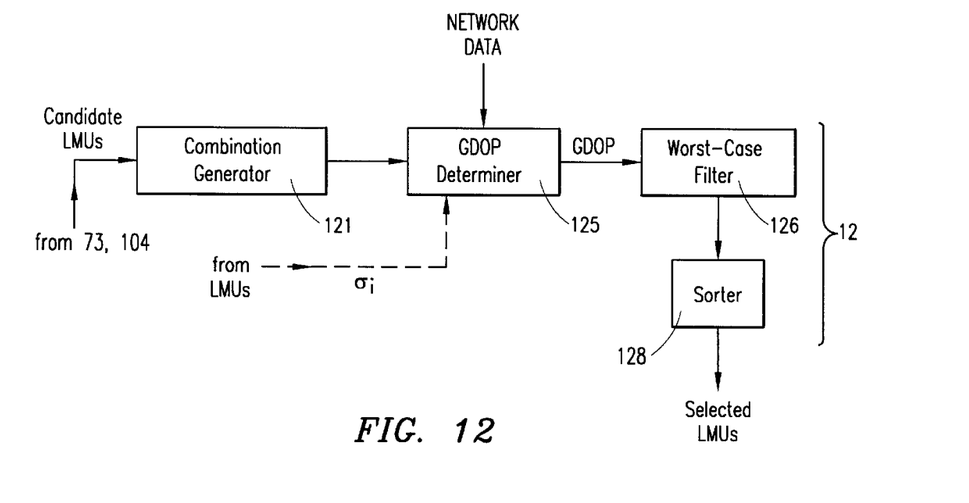
FIG. 12 illustrates an exemplary portion of the mobile location node of FIG. 1 for performing the exemplary operations of FIG. 11.

FIG. 12 illustrates pertinent portions of an exemplary embodiment of the mobile location node of FIG. 1, which can perform the exemplary operations illustrated in FIG. 11. A combination generator 121 receives information indicative of candidate LMUs, for example, from selector 104 of FIG. 10 or selector 73 of FIG. 7. The combination generator generates various combinations of the candidate LMUs, which combinations define the groups of LMUs for which GDOP values will be estimated. A GDOP determiner 125 receives from the combination generator information indicative of the LMU groups. The GDOP determiner 125 also receives network data defining $d_{TA}$ and the coordinate vectors and antenna normal vectors of the serving base station and the candidate LMUs. The GDOP determiner can then use Equations 1, 3–5 and 7–12 to calculate the estimated GDOP values for each group of LMUs. A selector 122, including a worst-case filter 126 and a sorter 128, is coupled to the GDOP determiner 125. The worst-case filter 126 receives the GDOP values for each group of LMUs and determines the worst-case value for that group. The sorter 128 receives the worst-case GDOP values of the respective groups, sorts them to determine the best worst-case GDOP value, and selects the corresponding group of LMUs having the best worst-case value.

In another embodiment, the mobile location node of FIG. 1 can send to all of the candidate LMUs of FIG. 12 a conventional measurement command. Each of the candidate LMUs will respond in conventional fashion by, for example, providing to the mobile location node conventional TOA information and the corresponding uncertainty parameter $\sigma_i$. These uncertainty parameters (shown in broken line in FIG. 12) are then used directly by the GDOP estimator to calculate the GDOP values without calculating $L_i$ values in Equation 4.

The mobile location node can in some cases use conventional measurement reports provided by the mobile stations. The measurement report from the mobile station can be forwarded from the associated fixed-site transceiver 11 to the mobile location node. For example, in GSM systems, such measurement reports contain measured signal strength C+I+N (carrier+interference+noise) on BCCH (broadcast control channel) frequencies of neighboring base stations for which the BSIC (base station identity code) has been decoded successfully. If the BSIC of a certain base station has been successfully decoded by the mobile station, it should be likely that an LMU cosited with that base station is suitable to use for an uplink measurement. Therefore, the mobile location node can use this additional information for LMU selection. Those LMUs cosited with base stations whose BSIC has been decoded successfully can be given priority over other LMU candidates.

Figure 13:
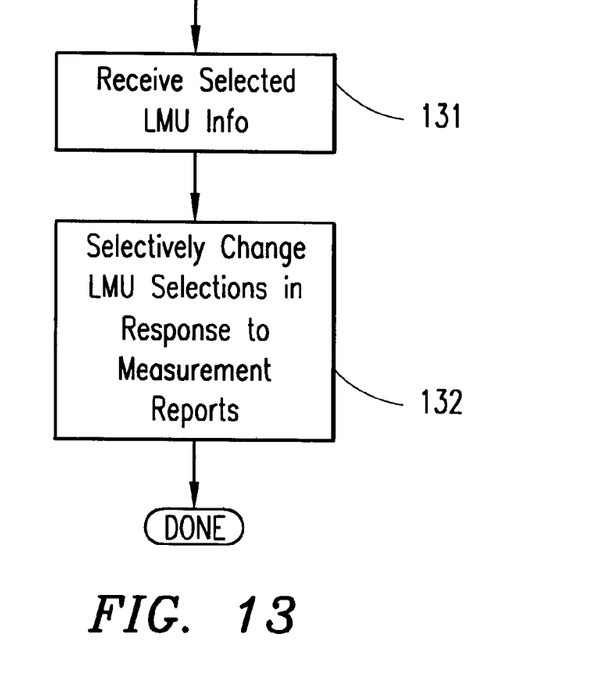
FIG. 13 illustrates further exemplary operations which can be performed by embodiments of the mobile location node of FIG. 1.

FIG. 13 illustrates exemplary operations which can be performed according to the invention in response to measurement reports received from the mobile stations. At 131, information indicative of the selected LMUs is received, for example the LMUs selected by the exemplary operations illustrated in FIGS. 6, 9 or 11. At 132, the LMU selections are selectively changed in response to the measurement reports. For example, the group of selected LMUs can be modified to ensure that it includes all LMUs that are cosited with base stations whose BSICs have been successfully decoded. In such instances, the most poorly qualified of the LMUs received at 131 can be replaced by LMUs cosited with base stations whose BSICs have been successfully decoded.

Figure 14:
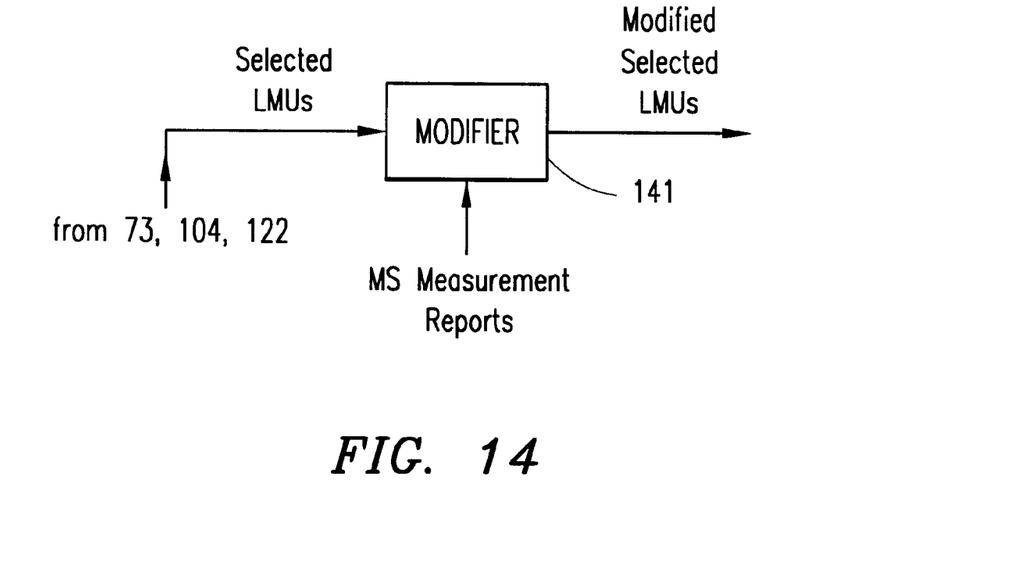
FIG. 14 illustrates an exemplary portion of the mobile location node of FIG. 1 for performing the exemplary operations of FIG. 13.

FIG. 14 illustrates pertinent portions of an exemplary embodiment of the mobile location node of FIG. 1, which can perform the exemplary operations illustrated in FIG. 13. A modifier 141 receives information indicative of the selected LMUs, for example, from selector 73 of FIG. 7, selector 104 of FIG. 10 or selector 122 of FIG. 12. The modifier 141 also receives measurement reports from the mobile stations, and selectively modifies the group of selected LMUs as described above in response to the received measurement reports.

Figure 15:
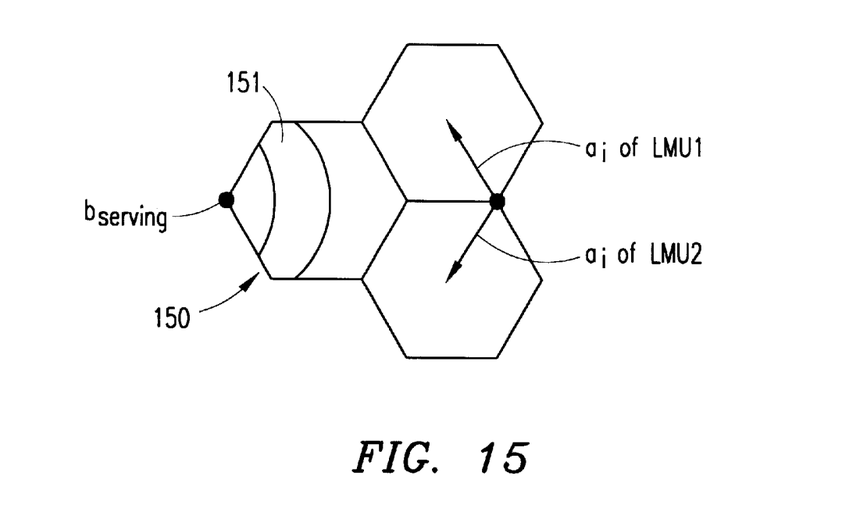
FIG. 15 illustrates further exemplary geometric relationships utilized by the present invention.

When using the inventive techniques described above, situations can occur when two LMUs are assigned the same value of their cost function, e.g., the same $d_i$ value in Equation 2 or the same worst-case $L_i$ value from Equation 4. In this case, the mobile location node can select both LMUs to perform measurements, or randomly select one of them. As FIG. 15 suggests, it is sometimes advantageous to select both LMUs, and afterwards either combine their results (e.g., by averaging) or choose the one with e.g., the highest SNR. As shown in FIG. 15, cosited LMU1 and LMU2 will yield the same distance $d_i$ in Equation 2, but LMU1 will be preferable if the MS is located in the upper portion 151 of the possible location area 150.

It will be evident to workers in the art that the above-described invention can be readily implemented by, for example, suitable modifications in software, hardware or both, in a conventional mobile location node such as a Mobile Location Center MLC in GSM.

Although exemplary embodiments of the present invention have been described above in detail, this does not limit the scope of the invention, which can be practiced in a variety of embodiments.

What is claimed is:

1. A method of selecting location measurement units for measuring an uplink signal transmitted by a mobile communication station operating in a wireless communication network in order to locate the position of the mobile communication station in the wireless communication network, comprising:

determining a geographic area of the network in which the mobile station is possibly located;

identifying a first position within the area;

determining relative positional relationships between the first position and a plurality of further positions respectively associated with a plurality of location measurement units in the network; and choosing a subset of the plurality of location measurement units for measuring the uplink signal based on the relative positional relationships.

2. The method of claim 1, wherein said identifying step includes defining the first position to be located substantially centrally within the area, and including defining the further positions based on location coordinates and antenna normal vectors associated with the respective location measurement units.

3. The method of claim 1, wherein said choosing step includes choosing a subset of the location measurement units whose associated further positions within the network are closest to the first position.

4. The method of claim 1, including predicting for each location measurement unit of the subset a path loss measure with respect to a possible position of the mobile station in the area and choosing a further subset of location measurement units from the first-mentioned subset of location measurement units based on the predicted path loss measures.

5. The method of claim 4, including selecting from the further subset of location measurement units a plurality of groups of location measurement units, determining for each group of location measurement units a geometric dilution of precision (GDOP) value with respect to a possible position of the mobile station in the area, and selecting one of the groups of location measurement units based on the GDOP values.

6. The method of claim 1, wherein said step of determining the geographic area includes determining the geographic area based on location coordinates and an antenna normal vector associated with a fixed-site transceiver serving the mobile station and also based on a timing advance value associated with the mobile station.

7. The method of claim 1, including receiving from the mobile station a measurement report including information indicative of signal strength of a control signal received at the mobile station from a fixed-site transmitter cosited in the network with a location measurement unit and, in response to the measurement report, selectively including the cosited location measurement unit in the subset of location measurement units.

8. A method of selecting location measurement units for measuring an uplink signal transmitted by a mobile communication station operating in a wireless communication network in order to locate the position of the mobile communication station in the wireless communication network, comprising:

identifying a possible position of the mobile station in the network;

predicting for each of a plurality of location measurement units in the network a respective path loss measure relative to the possible position of the mobile station; and choosing a subset of the plurality of location measurement units to measure the uplink signal based on the path loss measures.

9. The method of claim 8, including predicting for each of the plurality of location measurement units a plurality of path loss measures corresponding to a plurality of possible positions of the mobile station in the network, selecting for each of the plurality of location measurement units a highest of its associated path loss measures, and choosing a subset of the location measurement units whose associated highest path loss measures are lowest.

10. The method of claim 8, wherein said predicting step includes predicting a path loss measure for a location measurement unit based on a distance between the location measurement unit and the possible position of the mobile station and also based on an angle between an antenna normal vector of the location measurement unit and a further vector that defines said distance.

11. The method of claim 10, wherein said predicting step includes identifying, for each of the plurality of location measurement units, an antenna gain function associated with the location measurement unit, using the antenna gain function to calculate an antenna gain of the location measurement unit at said angle, calculating a value of a distance function based on said distance, and multiplying said value of said distance function by said antenna gain to produce the path loss measure associated with the location measurement unit.

12. The method of claim 8, wherein said identifying step includes identifying the possible position of the mobile station based on location coordinates and an antenna normal vector associated with a fixed-site transceiver serving the mobile station and also based on a timing advance value associated with the mobile station.

13. The method of claim 8, including receiving from the mobile station a measurement report including information indicative of signal strength of a control signal received at the mobile station from a fixed-site transmitter cosited in the network with a location measurement unit and, in response to the measurement report, selectively including the cosited location measurement unit in the subset of location measurement units.

14. A method of selecting location measurement units for measuring an uplink signal received from a mobile communication station operating in a wireless communication network in order to locate the position of the mobile communication station in the wireless communication network, comprising:

identifying a possible position of the mobile station in the network;

determining for each of a plurality of groups of location measurement units in the network a geometric dilution of precision (GDOP) value with respect to the possible position of the mobile station; and selecting one of the groups of location measurement units based on the GDOP values.

15. The method of claim 14, including determining for each group of location measurement units a plurality of GDOP values respectively corresponding to a plurality of possible positions of the mobile station in the network, selecting for each group of location measurement units a highest of its associated GDOP values, and selecting from the plurality of groups one group whose highest GDOP value is lower than the highest GDOP values of the remaining groups.

16. The method of claim 14, wherein said determining step includes determining the GDOP values independently of any uplink signal measurement information provided by location measurement units.

17. The method of claim 14, wherein said determining step includes determining the GDOP values based on uplink signal measurement information provided by location measurement units in the plurality of groups.

18. The method of claim 14, wherein said identifying step includes identifying the possible position of the mobile station based on location coordinates and an antenna normal vector associated with a fixed-site transceiver serving the mobile station and also based on a timing advance value associated with the mobile station.

19. The method of claim 14, including receiving from the mobile station a measurement report including information indicative of signal strength of a control signal received at the mobile station from a fixed-site transmitter cosited in the network with a location measurement unit and, in response to the measurement report, selectively including the cosited location measurement unit in the one selected group of location measurement units.

20. An apparatus for selecting location measurement units for measuring an uplink signal received from a mobile communication station operating in a wireless communication network in order to locate the position of the mobile communication station in the wireless communication network, comprising:

a first determiner having an input for receiving network information from which can be determined a geographic area of the network in which the mobile station is possibly located, said first determiner responsive to said network information for determining said geographic area and identifying a first position therein;

a second determiner coupled to said first determiner for receiving therefrom position information indicative of said first position, said second determiner having an input for receiving further network information indicative of positioning of a plurality of location measurement units in the network, said second determiner responsive to said position information and said further network information for determining relative positional relationships between said first position and a plurality of further positions respectively associated with said plurality of location measurement units; and a selector coupled to said second determiner for receiving therefrom positional relationship information indicative of said relative positional relationships, said selector responsive to said positional relationship information for selecting from said plurality of location measurement units a subset of location measurement units for measuring the uplink signal.

21. The apparatus of claim 20, wherein said first determiner is operable to define said first position to be located substantially centrally within said area, and wherein said further network information includes location coordinates and antenna normal vectors associated with the respective location measurement units.

22. The apparatus of claim 20, wherein said selector is responsive to said positional relationship information for selecting said subset to include location measurement units whose associated further positions within the network are closest to said first position.

23. The apparatus of claim 20, wherein the communication network is a GSM network and said apparatus is a GSM Mobile Location Center.

24. An apparatus for selecting location measurement units for measuring an uplink signal received from a mobile communication station operating in a wireless communication network in order to locate the position of the mobile communication station in the wireless communication network, comprising:

a path loss determiner having an input for receiving network information from which can be determined a possible position of the mobile station in the network, said network information further indicative of positioning of a plurality of location measurement units in the network, said path loss determiner responsive to said network information for identifying a possible position of the mobile station in the network, said path loss determiner further responsive to said network information for predicting, for each of said plurality of location measurement units, a respective path loss measure relative to said possible position of the mobile station; and a selector coupled to said path loss determiner for receiving therefrom path loss information indicative of said path loss measures, said selector responsive to said path loss information for selecting from said plurality of location measurement units a subset of location measurement units to measure the uplink signal.

25. The apparatus of claim 24, wherein the communication network is a GSM network and said apparatus is a GSM Mobile Location Center.

26. An apparatus for selecting location measurement units for measuring an uplink signal received from a mobile communication station operating in a wireless communication network in order to locate the position of the mobile communication station in the wireless communication network, comprising:

a determiner for receiving network information from which can be determined a possible position of the mobile station in the network, said network information further indicative of positioning of a plurality of location measurement units in the network, said determiner responsive to said network information for identifying a possible position of the mobile station in the network, and said determiner further responsive to said network information for determining, for each of a plurality of groups of said location measurement units, a geometric dilution of precision (GDOP) value with respect to said possible position of the mobile station; and a selector coupled to said determiner for receiving therefrom GDOP information indicative of said GDOP values, said selector responsive to said GDOP information for selecting one of said groups of location measurement units to measure the uplink signal.

27. The apparatus of claim 26, wherein the communication network is a GSM network and said apparatus is a GSM Mobile Location Center.

* * * * *